(12) United States Patent
Barnes et al.

(10) Patent No.: US 11,811,871 B2
(45) Date of Patent: Nov. 7, 2023

(54) CLOUD-BASED AUTHORITY TO ENHANCE POINT-TO-POINT DATA TRANSFER WITH MACHINE LEARNING

(71) Applicant: Signiant Inc., Lexington, MA (US)

(72) Inventors: Shane Daniel Barnes, Almonte (CA); Andrew Olatunde Belo, Ottawa (CA); Ian Kennedy Hamilton, Ottawa (CA)

(73) Assignee: Signiant Inc., Lexington, MA (US)

( * ) Notice: Subject to any disclaimer, the term of this patent is extended or adjusted under 35 U.S.C. 154(b) by 215 days.

(21) Appl. No.: 16/909,382

(22) Filed: Jun. 23, 2020

(65) Prior Publication Data

US 2020/0396289 A1    Dec. 17, 2020

Related U.S. Application Data

(63) Continuation of application No. 16/278,032, filed on Feb. 15, 2019, now Pat. No. 10,735,516.

(51) Int. Cl.
| | |
|---|---|
| *H04L 67/1097* | (2022.01) |
| *H04L 41/16* | (2022.01) |
| *G06N 20/00* | (2019.01) |
| *H04L 41/0816* | (2022.01) |
| *H04L 67/51* | (2022.01) |

(52) U.S. Cl.
CPC ......... *H04L 67/1097* (2013.01); *G06N 20/00* (2019.01); *H04L 41/0816* (2013.01); *H04L 41/16* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 5,319,644 | A | 6/1994 | Liang |
| 5,519,863 | A | 5/1996 | Allen |
| 5,552,776 | A | 9/1996 | Wade |
| 5,737,495 | A | 4/1998 | Adams |
| 5,796,966 | A | 8/1998 | Simcoe |
| 5,999,979 | A | 12/1999 | Vellanki |

(Continued)

FOREIGN PATENT DOCUMENTS

WO    2006019490    2/2006

OTHER PUBLICATIONS

"Direct Client-to-Client"—Wikipedia, the free encyclopedia, printed from http://en.wikipedia.org/w/index.php?title=Direct_Clienet-to-Client&oldid=344943093, Feb. 19, 2010, 8 pages.

(Continued)

*Primary Examiner* — Angela Nguyen
(74) *Attorney, Agent, or Firm* — Sheppard Mullin Richter & Hampton LLP

(57) ABSTRACT

Systems and methods to facilitate cloud-based point-to-point data transfer via machine learning are described herein. A request for a transfer of data between a sending system and a receiving system may be obtained. Receiving system information for the receiving system may be obtained. Values of transfer parameters for performing the transfer may be determined through machine-learning. The transfer may be performed based on the determined values. Results of the transfer may be obtained and provided to the machine-learning algorithm to further train the algorithm.

20 Claims, 2 Drawing Sheets

(56) References Cited

U.S. PATENT DOCUMENTS

| | | |
|---|---|---|
| 6,006,019 A | 12/1999 | Takei |
| 6,064,656 A | 5/2000 | Angal |
| 6,085,251 A | 7/2000 | Fabozzill |
| 6,128,653 A | 10/2000 | delVal |
| 6,163,543 A | 12/2000 | Chin |
| 6,163,809 A | 12/2000 | Buckley |
| 6,192,412 B1 | 2/2001 | Cantoral |
| 6,199,109 B1 | 3/2001 | Reder |
| 6,219,706 B1 | 4/2001 | Fan |
| 6,298,061 B1 | 10/2001 | Chin |
| 6,396,511 B1 | 5/2002 | Karino |
| 6,405,256 B1 | 6/2002 | Lin |
| 6,438,598 B1 | 8/2002 | Pedersen |
| 6,463,465 B1 | 10/2002 | Nieuwejaar |
| 6,557,122 B1 | 4/2003 | Sugauchi |
| 6,600,812 B1 | 7/2003 | Gentillin |
| 6,701,437 B1 | 3/2004 | Hoke |
| 6,718,361 B1 | 4/2004 | Basani |
| 6,742,023 B1 | 5/2004 | Fanning |
| 6,760,861 B2 | 7/2004 | Fukuhara |
| 6,763,384 B1 | 7/2004 | Gupta |
| 6,823,373 B1 | 11/2004 | Pancha |
| 6,859,835 B1 | 2/2005 | Hipp |
| 6,925,495 B2 | 8/2005 | Hegde |
| 6,976,095 B1 | 12/2005 | Wolrich |
| 6,996,631 B1 | 2/2006 | Aiken, Jr. |
| 7,051,365 B1 | 5/2006 | Bellovin |
| 7,054,935 B2 | 5/2006 | Farber |
| 7,103,889 B2 | 9/2006 | Hiltgen |
| 7,113,963 B1 | 9/2006 | McCaw |
| 7,139,805 B2 | 11/2006 | Seagren |
| 7,139,811 B2 | 11/2006 | LevRan |
| 7,152,105 B2 | 12/2006 | McClure |
| 7,152,108 B1 | 12/2006 | Khan |
| 7,177,897 B2 | 2/2007 | Manukyan |
| 7,257,630 B2 | 8/2007 | Cole |
| 7,308,710 B2 | 12/2007 | Yarborough |
| 7,343,301 B1 | 3/2008 | Nash |
| 7,403,934 B2 | 7/2008 | Polizzi |
| 7,406,533 B2 | 7/2008 | Li |
| 7,447,775 B1 | 11/2008 | Zhu |
| 7,461,067 B2 | 12/2008 | Dewing |
| 7,478,146 B2 | 1/2009 | Tervo |
| 7,526,557 B2 | 4/2009 | Bowler |
| 7,552,192 B2 | 6/2009 | Carmichael |
| 7,606,562 B2 | 10/2009 | Aaltonen |
| 7,676,675 B2 | 3/2010 | Billharz |
| 7,707,271 B2 | 4/2010 | Rudkin |
| 7,716,312 B2 | 5/2010 | Gamble |
| 7,913,280 B1 | 3/2011 | Roberts |
| 8,081,956 B2 | 12/2011 | Aaltonen |
| 8,667,145 B2 | 3/2014 | Bowler |
| 8,930,475 B1 | 1/2015 | North |
| 9,596,216 B1 | 3/2017 | North |
| 10,043,137 B1 | 8/2018 | Jorgensen |
| 2002/0032769 A1 | 3/2002 | Barkai |
| 2002/0049834 A1 | 4/2002 | Molnar |
| 2002/0077909 A1 | 6/2002 | Kanojia |
| 2002/0099729 A1 | 7/2002 | Chandrasekaran |
| 2002/0104008 A1 | 8/2002 | Cochran |
| 2002/0116485 A1 | 8/2002 | Black |
| 2002/0116616 A1 | 8/2002 | Mi |
| 2002/0165961 A1 | 11/2002 | Everdell |
| 2002/0169694 A1 | 11/2002 | Stone |
| 2002/0199000 A1 | 12/2002 | Banerjee |
| 2003/0014482 A1 | 1/2003 | Toyota |
| 2003/0028495 A1 | 2/2003 | Pallante |
| 2003/0028647 A1 | 2/2003 | Grosu |
| 2003/0046103 A1 | 3/2003 | Amato |
| 2003/0051026 A1 | 3/2003 | Carter |
| 2003/0056096 A1 | 3/2003 | Albert |
| 2003/0065950 A1 | 4/2003 | Yarborough |
| 2003/0088694 A1 | 5/2003 | Patek |
| 2003/0105830 A1 | 6/2003 | Pham |
| 2003/0115302 A1 | 6/2003 | Teraoaka |
| 2003/0115361 A1 | 6/2003 | Kirk |
| 2003/0120822 A1 | 6/2003 | Langrind |
| 2003/0126195 A1 | 7/2003 | Reynolds |
| 2003/0212806 A1 | 11/2003 | Mowers |
| 2003/0216958 A1 | 11/2003 | Register |
| 2003/0221014 A1 | 11/2003 | Kosiba |
| 2004/0003152 A1 | 1/2004 | Fussell |
| 2004/0015728 A1 | 1/2004 | Cole |
| 2004/0049550 A1 | 3/2004 | Yu |
| 2004/0073681 A1 | 4/2004 | Fald |
| 2004/0093420 A1 | 5/2004 | Gamble |
| 2004/0117829 A1 | 6/2004 | Karaoguz |
| 2004/0122888 A1 | 6/2004 | Carmichael |
| 2004/0139212 A1 | 7/2004 | Mukherjee |
| 2004/0254914 A1 | 12/2004 | Polizzi |
| 2005/0044250 A1 | 2/2005 | Gay |
| 2005/0086359 A1 | 4/2005 | Banerjee |
| 2005/0086533 A1 | 4/2005 | Hsieh |
| 2005/0251575 A1 | 11/2005 | Bayardo |
| 2005/0261796 A1 | 11/2005 | Shen |
| 2006/0015580 A1 | 1/2006 | Gabriel |
| 2007/0073727 A1 | 3/2007 | Klein |
| 2007/0130143 A1 | 6/2007 | Zhang |
| 2007/0185902 A1 | 8/2007 | Messinger |
| 2008/0016205 A1 | 1/2008 | Svendsen |
| 2008/0250028 A1 | 10/2008 | Rutherglen |
| 2008/0319760 A1 | 12/2008 | DaPalma |
| 2009/0037520 A1 | 2/2009 | Loffredo |
| 2009/0077220 A1 | 3/2009 | Svendsen |
| 2009/0083117 A1 | 3/2009 | Svendsen |
| 2009/0083362 A1 | 3/2009 | Svendsen |
| 2009/0138477 A1 | 5/2009 | Piira |
| 2009/0164283 A1 | 6/2009 | Coley |
| 2010/0122180 A1 | 5/2010 | Kamiyama |
| 2010/0205261 A1 | 8/2010 | Michel |
| 2010/0293147 A1 | 11/2010 | Snow |
| 2011/0009991 A1 | 1/2011 | Dinicola |
| 2011/0022642 A1 | 1/2011 | deMilo |
| 2011/0225270 A1 | 9/2011 | Taniguchi |
| 2014/0032503 A1 | 1/2014 | Nash |
| 2014/0269932 A1 | 9/2014 | Su |
| 2017/0371558 A1 | 12/2017 | George |
| 2018/0316588 A1* | 11/2018 | Miernik ............ H04L 43/0888 |
| 2019/0028504 A1 | 1/2019 | Shtar |

OTHER PUBLICATIONS

"ISOCOR Releases Industry's Most Powerful Message Server", Nov. 14, 1994, M2 Presswire, pp. 1-3.

"SmartFTP—What is FXP?", printed from http://www.smartftp.com/support/kb/what-is-fxp-f14.html, May 16, 2007, 1 page.

Premo, Rita, "A Picture-Perfect Travel Log; Working Wise; Avaya Inc.; Brief Article", Aug. 1, 2002, Security Management, No. 8, vol. 46, p. 25, ISSN: 0145-9406, pp. 1-3.

Waldrop, Clarence, et al., "Making a TCP/IP Connection Through a Firewall", Candle Advanced Technical Corner Tips and Tricks, copyright 2003, 7 pages.

* cited by examiner

CLOUD-BASED AUTHORITY TO ENHANCE POINT-TO-POINT DATA TRANSFER WITH MACHINE LEARNING

CROSS-REFERENCE TO RELATED APPLICATIONS

This application is a continuation of U.S. patent application Ser. No. 16/278,032, filed Feb. 15, 2019, entitled "CLOUD-BASED AUTHORITY TO ENHANCE POINT-TO-POINT DATA TRANSFER WITH MACHINE LEARNING", which is hereby incorporated herein by reference in its entirety.

FIELD OF THE DISCLOSURE

The disclosure relates to enhancing the management and efficiency of point-to-point data transfer using an independent cloud-based system for rendering decisions, monitoring transfer results, and/or improving the decision making process via machine learning.

BACKGROUND

Point-to-point data transfer systems in general are known. Many known system use local information (e.g., available to an endpoint) to make data transfer decisions. Many use static configurations. Many set the parameters for a single transport mechanism.

For these and other reasons, known systems suffer from various drawbacks and inefficiencies.

SUMMARY

One aspect of the invention relates to a point-to-point data transfer system that includes an independent, cloud-based server that can be queried for values of transfer parameters to use on a point-to-point data transfer from a source (e.g., sending system) to a destination (e.g., receiving system) via a network. The determination of the values of the transfer parameters to be used may be determined by the system based on one or more of current observed network conditions (e.g., between the source and the destination), observed data set characteristic (size of files, number of files, storage type), and/or other information.

According to another aspect of the invention, the system may adjust values for one or both of transport layer parameters and/or application layer parameters. The system may choose between multiple transport mechanisms (e.g., TCP vs UDP) rather than just setting parameters for a single transport mechanism (e.g., TCP).

The system may apply a decision algorithm (described herein) to answer the queries. According to another aspect of the invention, the system may apply unsupervised goal-based machine learning to improve its answers over time.

The system may also record the throughput and/or other results related to the transfer achieved via the cloud service and/or provide a reporting functionality.

The system includes many technical advantages, including that: decisions may be made using an independent remote authority rather than local information or a static configuration; the system may have global visibility into transfer results and/or other information may incorporate this into decisions (e.g., rather than just information available to an endpoint); the system may adjust both transport layer parameters and application layer parameters, not just transport layer parameters; the system may choose between multiple transport mechanisms (e.g., TCP vs UDP) rather than just setting parameters for a single transport mechanism (e.g., TCP); and/or the system may consider characteristics of the data being transferred in rendering decisions.

The system may include one or more processors configured by machine-readable instructions and/or other components. The machine-readable instructions may include one or more computer program components. The one or more computer program components may include one or more of a request component, a receiving system component, transfer component, a results component, and/or other components.

The request component may be configured to obtain one or more requests. A request may be related to a transfer of data (e.g., set of information) between endpoints (e.g., a sending system and a receiving system). The requests may be obtained from sending systems and/or receiving systems. A request may include sending system information for the sending system and/or other information. The sending system information may include one or more values of one or more sending system parameters. The sending system parameters may include one or more of a sending system identifier parameter, a data identifier parameter, and/or other parameters.

The receiving system component may be configured to obtain receiving system information for one or more receiving systems. The receiving system information may include values of one or more receiving system parameters. The receiving system parameters may include one or more of a receiving system identifier parameter, a configuration parameter, and/or other parameters.

The transfer component may be configured to obtain network information. The network information may include a value of one or more network parameters. The network parameters may include one or more of a network latency, a network bandwidth, a network packet loss, and/or other information. The network information may be included within obtained sending system information and/or receiving system information, determined by the transfer component (and/or one or more other components of the system), and/or otherwise obtained. For example, a value of one or more network parameters may be determined based on information related to one or more prior transfers.

The transfer component may be configured to determine one or more values of one or more transfer parameters for performing transfers of data between individual ones of the sending systems and individual ones of the receiving systems. The determination may be based on one or more of sending system information, receiving system information, and/or other information. The determination may be based on a machine-learning algorithm trained based on previous, historical, and/or ongoing transfers of data. The transfer parameters may include one or more of one or more transport layer parameters, one or more application layer parameters, and/or other parameters.

The transfer component may be configured to perform one or more transfers of data between individual sending systems and individual receiving systems based on values of the transfer parameters and/or other information.

The results component may be configured to obtain results information and/or other information. The results information including one or more of transfer throughput of individual transfers, transfer duration of individual transfers, receiving system information, and/or other information. The results component may be configured to provide the results information and/or other information to the machine-learning algorithm.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
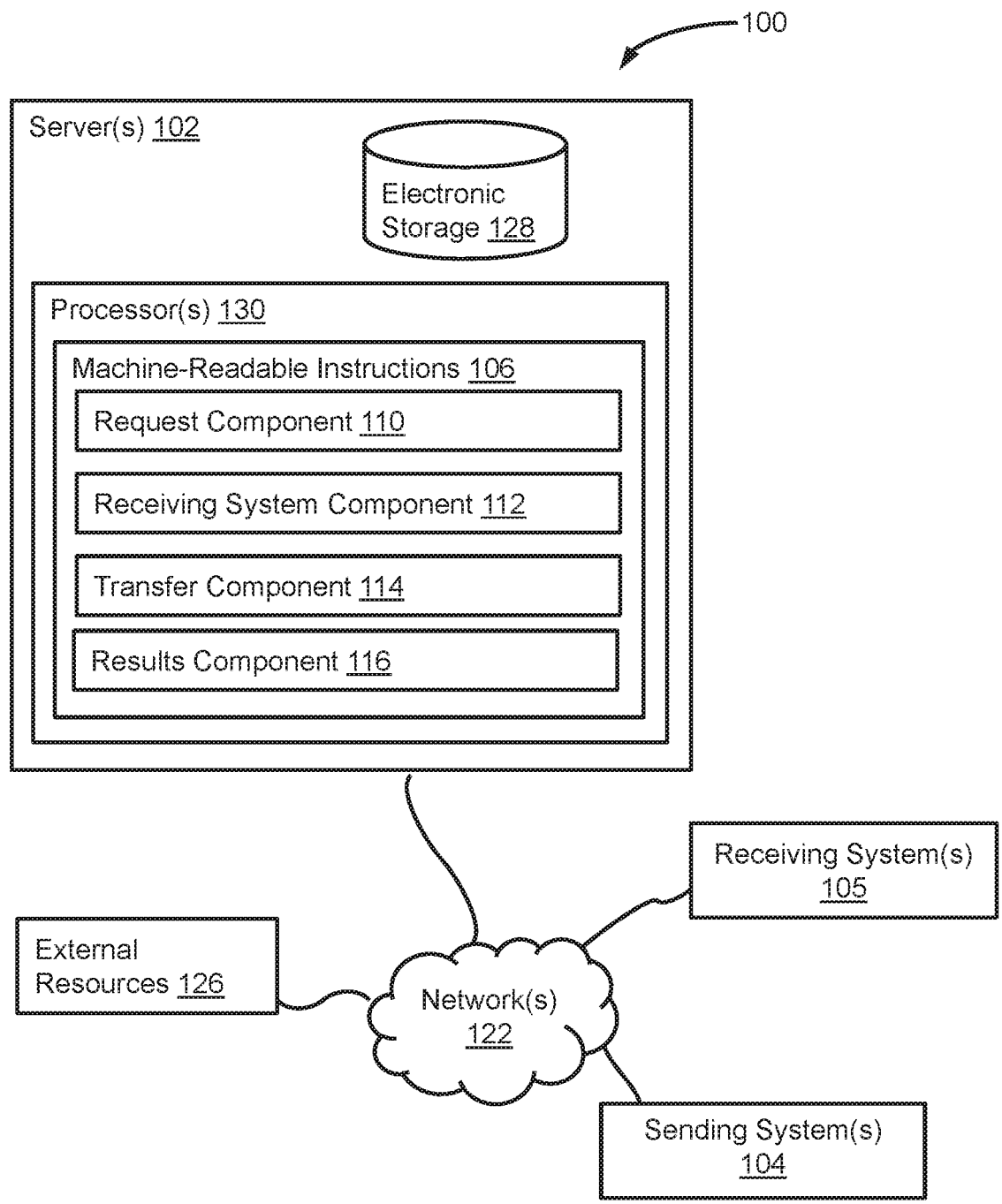
FIG. 1 illustrates a system configured to facilitate cloud-based point-to-point data transfer via machine learning, in accordance with one or more implementations.

FIG. 1 illustrates a system 100 configured to facilitate cloud-based point-to-point data transfer via machine learning, accordance with one or more implementations. A transfer of data may be based on determined values of one or more transfer parameters. The determination of the values of the transfer parameters to be used may be determined based on one or more of current observed network conditions (between the source and the destination), observed data set characteristic (size of files, number of files, storage type), and/or other information. The system 100 may adjust values for one or both of transport layer parameters and/or application layer parameters included in the transfer parameters. The system 100 may choose between multiple transport mechanisms (e.g., TCP vs UDP) rather than just setting parameters for a single transport mechanism (e.g., TCP). In some implementations, data to be transferred may be in the form of files, objects, metadata, and/or other information.

In some implementations, system 100 may include one or more of one or more servers 102, one or more sending systems 104, one or more receiving systems 105, and/or other components.

Individual sending systems of one or more sending system 104 may include entities configured to store and/or transfer (e.g., send and/or receive) information. The individual sending systems may include one or more of a computer, a server, non-transitory electronic storage, and/or other system and/or component configured to store and/or transfer information.

Individual receiving systems of one or more receiving systems 105 may include entities configured to store and/or transfer (e.g., send and/or receive) information. The individual receiving system may include one or more of a computer, a server, non-transitory electronic storage, and/or other system and/or component configured to store and/or transfer information.

Server(s) 102 may be configured to communicate with one or more sending systems 104, one or more receiving systems 105, and/or other components of system 100 according to a client/server architecture, peer-to-peer architecture, and/or other architectures. One or more of the sending systems 104 and/or receiving systems 105 may also comprise servers and/or other components of system 100 according to a client/server architecture, peer-to-peer architecture, and/or other architectures. Communications may be facilitated through network(s) 122. The network(s) 122 may include wired and/or wireless connections. The network(s) 122 may include the Internet, Bluetooth, USB, and/or other communication networks. It will be appreciated that this is not intended to be limiting and that the scope of this disclosure includes implementations in which components of system 100 may be operatively linked via some other communication media. In some implementations, server(s) 102 may comprise a cloud-based server. The server(s) 102 may be separate and distinct from the receiving systems and the sending systems.

Server(s) 102 may include one or more of non-transitory electronic storage 128, one or more physical processors 130 configured by machine-readable instructions 106, and/or other components.

The non-transitory electronic storage 128 may be configured to store a machine-learning algorithm and/or other information configured to facilitate cloud-based point-to-point data transfer. The machine-learning algorithm may include an unsupervised goal-based machine learning program. The machine-learning algorithm may be provided input from one or more components of machine-readable instructions 106. Compared to supervised learning where training data is labeled with the appropriate classifications, unsupervised learning may learn relationships between elements in the provided data sets and provide output without user input. The relationships can take many different algorithmic forms, but some models may have the same goal of mimicking human logic by searching for indirect hidden structures, patterns, and/or features to analyze new data.

In FIG. 1, executing the machine-readable instructions 106 may cause one or more physical processors 130 to facilitate cloud-based point-to-point data transfer via machine learning. Machine-readable instructions 106 may include one or more computer program components. The computer program components may include one or more of a request component 110, a receiving system component 112, a transfer component 114, a results component 116, and/or other computer program components.

The request component 110 may be configured to obtain one or more requests. A request may be related to a transfer of data (e.g., set of information) between a sending system and a receiving system. The request may be obtained from individual sending systems and/or individual receiving systems. A request may include sending system information for the sending system and/or other information. For example, the request may include receiving system information, network information, and/or other information. In various implementations, The sending system information may include one or more values of one or more sending system parameters. The sending system parameters may include one or more of a sending system identifier parameter, a data identifier parameter, and/or other parameters.

In some implementations, a value of a sending system identifier parameter for a given sending system may specify information identifying the given sending system. By way of non-limiting illustration, a value of a sending system identifier parameter may specify one or more of an IP address, a host name, and/or other information.

In some implementations, a value of a data identifier parameter may specify characteristics of the information to be transferred for a given request. By way of non-limiting illustration, a value of a data identifier parameter may specify one or more of a storage type (e.g., object, file, and/or other type), a container or key prefix (e.g., object storage), a file system path, file size, block fill, ratio of metadata to data, and/or other information. A file system path may include a network path for network attached storage.

In some implementations, the request component 110 may be configured to obtain read impact information and/or other information. The read impact information may identify sending system information which may have an impact on one or both of read size or read latency. Read size may include a quantity of information capable of being transferred at a given time. Read size may be expressed in units of bytes. Read latency may include the time required to access data to begin a transfer process. In some implementations, sending system information which may have an impact on one or both of read size and/or read latency may include one or more of storage type, file size, a measure of block fill (e.g., number of bytes or bits), ratio of metadata to data, and/or other information. The measure of block fill may refer to an average block fill. The read impact information may provide insight on how to get a maximum disk read speed for a given sending system and a maximum data write speed for a given receiving system. The read impact information may be used to establish an optimal block size to read/write with and/or an optimal number of blocks to be read/written in parallel. In some implementations, storage type, average file/object size, and/or the storage configuration may comprise main factors that impact read size and/or read latency. However, machine-learning may result in a determination of other factors which may impact read/write properties of the data transfer.

The receiving system component 112 may be configured to obtain receiving system information for individual receiving systems of the one or more receiving systems 105. The receiving system information may include one or more values of one or more receiving system parameters. The receiving system parameters may include one or more of a receiving system identifier parameter, a data identifier parameter, a configuration parameter, and/or other parameters.

A value of a receiving system identifier parameter may specify information identifying an individual receiving system. By way of non-limiting illustration, a value of a receiving system identifier may include one or more of an IP address, host name, and/or other information.

In some implementations, a value of a data identifier parameter may specify characteristics of the information as it is to be stored at the receiving system. By way of non-limiting illustration, a value of a data identifier parameter may specify one or more of a storage type (e.g., object, file, and/or other type), a container or key prefix (e.g., object storage), a file system path, and/or other information.

A value of a configuration parameter may specify characteristics of the configuration of hardware and/or software components of an individual receiving system. By way of non-limiting illustration, a value of a configuration parameter may include one or more of a quantity of central processing units (CPUs) and/or virtual CPUs, a speed of CPUs, a quantity of network interfaces, a network interface speed, a quantity of memory, a quantity of graphics processing units (GPUs), and/or other information.

The transfer component 114 may be configured to obtain network information. Network information may include a value of one or more network parameters. A value of a network parameter may specify characteristics of network(s) 122 via which data is to be transferred. By way of non-limiting illustration, a value of a network parameter may include one or more of a network latency, a network bandwidth, a network packet loss, and/or other information. Network latency may indicate time delay occurring in communications performed over network(s) 122. Network bandwidth may include a bit-rate of available or consumed data capacity for communications performed over network(s) 122. The network bandwidth may be expressed in bits per second. Network packet loss may refer to packets of data communicating through network(s) 122 which may fail to reach their destination. Packet loss may occur by errors in data transmission or network congestion. Packet loss may be expressed as a percentage of packets lost with respect to packets sent.

The network information may be obtained from and/or determined by one or more sources. In some implementations, network information may be included within sending system information, receiving system information, and/or other sets of information obtained by server(s) 102. In some implementations, transfer component 114 may be configured to determine network information. For example, transfer component 114 may be configured to determine a value of one or more network parameters based on information related to one or more prior transfers. In some implementations, transfer component 114 may be configured to determine a value of one or more network parameters based on results information and/or other information obtained by results component 116 described herein.

The transfer component 114 may be configured to determine one or more values of one or more transfer parameters for performing transfers of data between individual ones of the sending systems and individual ones of the receiving systems. The determination may be based on one or more of sending system information, read impact information, receiving system information, and/or other information. The determination may be based on the machine-learning algorithm stored in electronic storage 128.

The transfer parameters may include one or more of one or more transport layer parameters, one or more application layer parameters, and/or other parameters.

A value of a transport layer parameter may specify one or more protocols associated with a transport layer of a layered architecture of protocols for performing data transfers. By way of non-limiting illustration, a value of a transport layer parameter may specify a transport algorithm to use for a given transfer. A transport algorithm may include one or more of transmission control protocol (TCP), user datagram protocol (UDP), datagram congestion control protocol (DCCP), stream control transmission protocol (SCTP), and/or other transport protocols or algorithms.

A value of an application layer parameter may specify information used at an application layer of a layered architecture of protocols for performing data transfers. By way of non-limiting illustration, a value of an application layer parameter may include one or more of a (maximum) quantity of parts of data to be transferred, a (maximum) part size of the individual parts, and/or other information. Data being transferred may be distributed across multiple transfer streams (an ordered sequence of bytes that makes up a part of a file or object). The information being transferred over a stream may be referred to as a "part." A part may represent a single file/object or a piece of a larger file/object. Different receiving and/or sending systems may react to different part sizes in different ways. For example, a particular receiving system may have a very specific part size it performs best with. Generally, for any transport a bigger part size may be better, but the size of the part and the size of information being sent may start to impact the number of parallel streams (or parts). In a situation where there may be a large number of CPUs available and low latency, it may make sense to use smaller part size to be able to use more streams. A key component here may be that there may be a large number of inputs that impact the optimal values of transfer parameters. While educated guesses may be made for some values based on the inputs, the system 100 herein may collect information in the machine-learning algorithm in an automated way to determine real relationships in real world situations. By systematically varying thresholds for decisions, the system 100 may generate recommend values that may provide better or worse results that can feedback into future decisions.

The transfer component 114 may be configured to perform one or more transfers of data between individual sending systems and individual receiving systems based on the determined values of the transfer parameters and/or other information.

The results component 116 may be configured to obtain results information and/or other information. The results information may include one or more of transfer throughput of individual transfers, transfer duration of individual transfers, receiving system information, and/or other information. Transfer throughput may include how much actual data was transmitted between a sending system and a receiving system. Transfer throughput may be expressed in terms of bits per second and/or other terms. Transfer duration may include the time duration between initiating the start of a transfer and an end of the transfer. Transfer duration may be expressed in terms of seconds.

The results component 116 may be configured to provide the results information and/or other information to the machine-learning algorithm stored in electronic storage 128. As described herein, transfer component 114 may be configured to determine one or more values of one or more transfer parameters for performing transfers based on the machine-learning algorithm stored in electronic storage 128. Over time and multiple data transfers, the machine-learning algorithm may learn the most optimal values of the transfer parameters to provide most throughput and lowest transfer duration based on one or more of the sending system characteristics, receiving system characteristics, data characteristics, and/or network characteristics.

In FIG. 1, in some implementations, server(s) 102, one or more receiving systems 105, one or more sending system 104, and/or external resources 126 may be operatively linked via one or more electronic communication links. For example, such electronic communication links may be established, at least in part, via a network 122 such as the Internet, Bluetooth, and/or other networks. It will be appreciated that this is not intended to be limiting, and that the scope of this disclosure includes implementations in which server(s) 102, one or more receiving systems 105, one or more sending system 104, and/or other components may be operatively linked via some other communication media.

External resources 126 may include sources of information outside of system 100, external entities participating with system 100, and/or other resources. In some implementations, some or all of the functionality attributed herein to external resources 126 may be provided by resources included in system 100.

Illustration of one or more processors 130 in FIG. 1 is not intended to be limiting. The one or more processors 130 may include a plurality of hardware, software, and/or firmware components operating together to provide the functionality attributed herein to one or more processors 130. For example, one or more processors 130 may be implemented by a cloud of computing platforms operating together as one or more processors 130.

Electronic storage 128 may comprise non-transitory storage media that electronically stores information. The electronic storage media of electronic storage 128 may include one or both of system storage that is provided integrally (i.e., substantially non-removable) with one or more processors 130 and/or removable storage that is removably connectable to one or more processors 130 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from one or more sending systems 104, information received from one or more receiving systems 105, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 110, 112, 114, 116, and/or other components. Processor(s) 130 may be configured to execute components 110, 112, 114, 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, and 116 are illustrated in FIG. 1 as being implemented within a single processing unit, in implementations in which processor(s) 130 includes multiple processing units, one or more of components 110, 112, 114, and/or 116 may be implemented remotely from the other components. The description of the functionality provided by the different components 110, 112, 114, and/or 116 described below is for illustrative purposes, and is not intended to be limiting, as any of components 110, 112, 114, and/or 116 may provide more or less functionality than is described. For example, one or more of components 110, 112, 114, and/or 116 may be eliminated, and some or all of its functionality may be provided by other ones of components 110, 112, 114, and/or

116. As another example, processor(s) 130 may be configured to execute one or more additional components that may perform some or all of the functionality attributed below to one of components 110, 112, 114, and/or 116.

Figure 2:
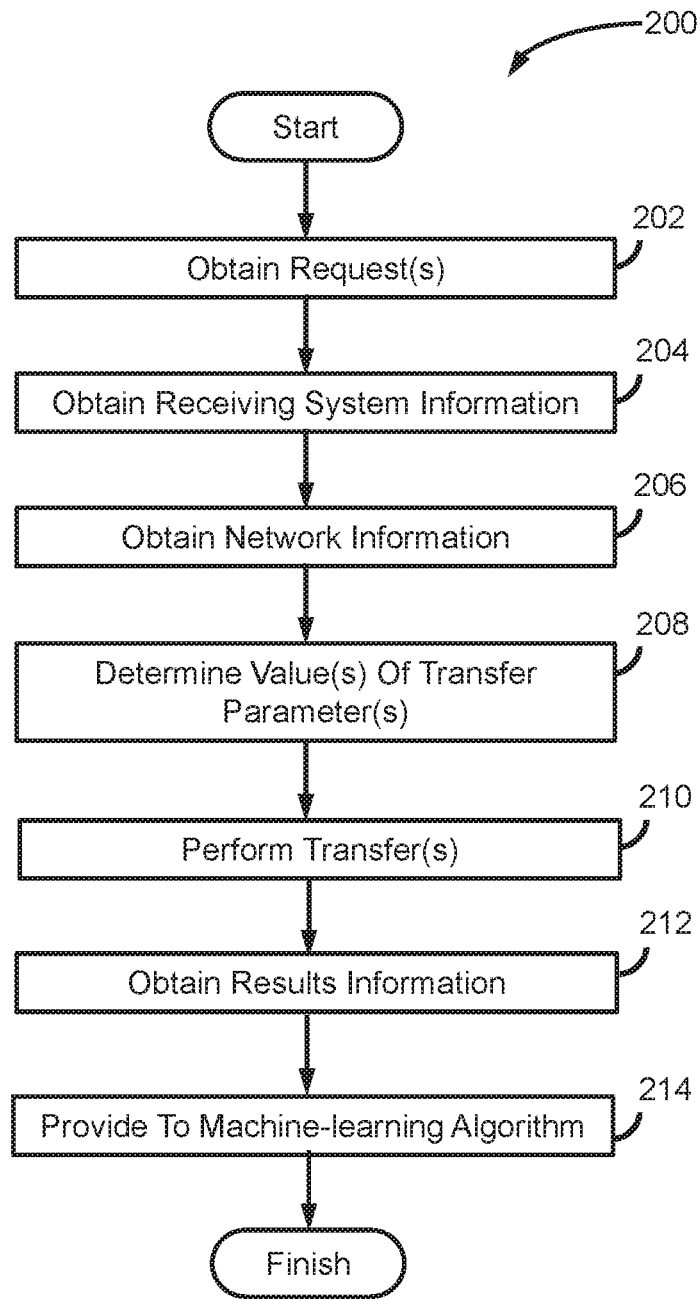
FIG. 2 illustrates a method to facilitate cloud-based point-to-point data transfer via machine learning, in accordance with one or more implementations.

FIG. 2 illustrates a method 200 to facilitate cloud-based point-to-point data transfer via machine learning, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a request for a transfer of data between a sending system and a receiving system. The request may include sending system information for the sending system and/or other information. The sending system information may include one or more values of one or more sending system parameters. The sending system parameters may include one or more of a sending system identifier parameter, a data identifier parameter, and/or other parameters. Operation 202 may be performed by one or more hardware processors configured by machine-readable instructions including a component that is the same as or similar to request component 110 (shown in FIG. 1 and described herein).

An operation 204 may include obtaining receiving system information for the receiving system. The receiving system information may include one or more values of one or more receiving system parameters. The receiving system parameters may include one or more of a receiving system identifier parameter, a configuration parameter, and/or other parameters. Operation 204 may be performed by one or more hardware processors configured by machine-readable instructions including a component that is the same as or similar to receiving system component 112 (shown in FIG. 1 and described herein).

An operation 206 may include obtaining network information. The network information may include a value of one or more network parameters. A value of a network parameter may specify characteristics of network(s) via which data is to be transferred. For example, a value of a network parameter may include one or more of a network latency, a network bandwidth, a network packet loss, and/or other information. The network information may be obtained from and/or determined by one or more sources. In some implementations, network information may be included within sending system information, receiving system information, and/or other sets of obtained information. In some implementations, network information may be determined by one or components described herein. For example, network information may be determined based on information related to one or more prior transfers. Operation 206 may be performed by one or more hardware processors configured by machine-readable instructions including a component that is the same as or similar to transfer component 114 (shown in FIG. 1 and described herein).

An operation 208 may include determining, based on one or more of the sending system information, the receiving system information, and/or other information, one or more values of one or more transfer parameters for performing the transfer of the data between the sending system and the receiving system. The transfer parameters may include one or more of one or more transport layer parameters, one or more application layer parameters, and/or other parameters. Operation 208 may be performed by one or more hardware processors configured by machine-readable instructions including a component that is the same as or similar to transfer component 114 (shown in FIG. 1 and described herein).

An operation 210 may include performing the transfer of the data between the sending system and the receiving system based on the one or more values of the one or more transfer parameters and/or other information. Operation 210 may be performed by one or more hardware processors configured by machine-readable instructions including a component that is the same as or similar to transfer component 114 (shown in FIG. 1 and described herein).

An operation 212 may include obtaining results information and/or other information. The results information may include one or more of a transfer throughput of the transfer, a transfer duration of the transfer, the receiving system information, and/or other information. Operation 212 may be performed by one or more hardware processors configured by machine-readable instructions including a component that is the same as or similar to results component 116 (shown in FIG. 1 and described herein).

An operation 214 may include providing the results information to a machine-learning algorithm. Operation 214 may be performed by one or more hardware processors configured by machine-readable instructions including a component that is the same as or similar to results component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A cloud-based point-to-point data transfer system, comprising: one or more physical processors configured by machine-readable instructions to:
   obtain, by the transfer system, a request for a transfer of data from a sending system to a receiving system, the request including at least one current sending system parameter indicative of one or more current characteristics of at least one of the sending system or the data as it is stored at the sending system prior to the transfer that has an impact on one or both of read size or read latency;
   obtain, by the transfer system, at least one receiving system parameter indicative of one or more current characteristics of at least one of the receiving system or the data as it is to be stored at the receiving system according to the transfer;

determine, by the transfer system, a value of at least one current network parameter;

determine, by the transfer system and based on a machine learning algorithm, a value of at least one transfer parameter for performing the transfer of the data from the sending system to the receiving system based at least in part on one or more of the at least one current sending system parameter, the least one current receiving system parameter, and the value of the at least one current network parameter, the at least one transfer parameter comprises a transport layer parameter, and the determination comprises setting a value of the transport layer parameter by choosing between different transport protocols;

perform, by the transfer system, the transfer of the data between the sending system and the receiving system based at least in part on the value of the at least one transfer parameter;

obtain, by the transfer system, results information indicative of one or more characteristics of the transfer; and provide, by the transfer system, the results information to the machine-learning algorithm.

2. The system of claim 1, wherein the at least one current network parameter comprises one or more of network latency, network bandwidth, or network packet loss.

3. The system of claim 2, wherein the one or more physical processors are configured to determine the value of the at least one current network parameter based at least in part on one or more prior values of the at least one network parameter corresponding to one or more prior transfers.

4. The system of claim 1, wherein the at least one current sending system parameter further includes a data identifier parameter, and wherein the data identifier parameter comprises one of a storage type of the data, a container prefix of the data, or a file system path of the data at the sending system.

5. The system of claim 1, wherein the at least one current sending system parameter further includes a sending system identifier parameter comprising an IP address or a host name of the sending system.

6. The system of claim 1, wherein the at least one transfer parameter further comprises an application layer parameter.

7. The system of claim 6, wherein a value of the application layer parameter specifies at least one of a quantity of individual parts of the data to be transferred or a part size of the individual parts.

8. The system of claim 1, wherein the at least one current receiving system parameter includes a receiving system identifier parameter and a configuration parameter, the receiving system identifier parameter comprising an IP address or a host name of the receiving system, and the configuration parameter comprising one or more of a quantity of central processing units (CPUs) or virtual CPUs, a speed of the CPUs, a quantity of network interfaces, a network interface speed, a quantity of memory, or a quantity of graphical processing units (GPUs).

9. The system of claim 1, wherein the one or more characteristics of the transfer comprise at least one of a transfer throughput of the transfer or a transfer duration of the transfer.

10. The system of claim 9, wherein the one or more physical processors are further configured by the machine-readable instructions to train the machine-learning algorithm to learn an optimal value of the at least one transfer parameter that maximizes the transfer throughput or minimizes the transfer duration.

11. A method to facilitate cloud-based point-to-point data transfer by a transfer system, the method comprising:

obtaining, by the transfer system, a request for a transfer of data from a sending system to a receiving system, the request including at least one current sending system parameter indicative of one or more current characteristics of at least one of the sending system or the data as it is stored at the sending system prior to the transfer that has an impact on one or both of read size or read latency;

obtaining, by the transfer system, at least one receiving system parameter indicative of one or more current characteristics of at least one of the receiving system or the data as it is stored at the receiving system according to the transfer;

determining, by the transfer system, a value of at least one current network parameter;

determining, by the transfer system and based on a machine learning algorithm, a value of at least one transfer parameter for performing the transfer of the data from the sending system to the receiving system based at least in part on one or more of the at least one current sending system parameter, the at least one current receiving system parameter, and the value of the at least one current network parameter, the at least one transfer parameter comprises a transport layer parameter, and the determination comprises setting a value of the transport layer parameter by choosing between different transport protocols;

performing, by the transfer system, the transfer of the data between the sending system and the receiving system based on the value of the at least one transfer parameter;

obtaining, by the transfer system, results information indicative of one or more characteristics of the transfer; and providing, by the transfer system, the results information to the machine-learning algorithm.

12. The method of claim 11, wherein the at least one current network parameter comprises one or more of network latency, network bandwidth, or network packet loss.

13. The method of claim 12, wherein determining the value of the at least one current network parameter comprises determining the value of the at least one current network parameter based at least in part on one or more prior values of the at least one network parameter corresponding to one or more prior transfers.

14. The method of claim 11, wherein the at least one current sending system parameter further includes a data identifier parameter, and wherein the data identifier parameter comprises one of a storage type of the data, a container prefix of the data, or a file system path of the data at the sending system.

15. The method of claim 11, wherein the at least one current sending system parameter further includes a sending system identifier parameter comprising an IP address or a host name of the sending system.

16. The method of claim 11, wherein the at least one transfer parameter further comprises an application layer parameter.

17. The method of claim 16, wherein a value of the application layer parameter specifies at least one of a quantity of individual parts of the data to be transferred or a part size of the individual parts.

18. The method of claim 11, wherein the at least one current receiving system parameter includes a receiving system identifier parameter and a configuration parameter, the receiving system identifier parameter comprising an IP address or a host name of the receiving system, and the configuration parameter comprising one or more of a quantity of central processing units (CPUs) or virtual CPUs, a speed of the CPUs, a quantity of network interfaces, a network interface speed, a quantity of memory, or a quantity of graphical processing units (GPUs).

19. The method of claim 11, wherein the one or more characteristics of the transfer comprise at least one of a transfer throughput of the transfer or a transfer duration of the transfer.

20. The method of claim 11, further comprising training the machine-learning algorithm to learn an optimal value of the at least one transfer parameter that maximizes the transfer throughput or minimizes the transfer duration.

\* \* \* \* \*